3,326,863
Patented June 20, 1967

3,326,863
POLYMERS AND PROCESS
William Earl Tatum, Tonawanda, N.Y., and Roger Lea Thornton, Wilmington, Del., assignors to E. I. du Pont de Nemours and Company, Wilmington, Del., a corporation of Delaware
No Drawing. Filed Nov. 21, 1963, Ser. No. 325,469
10 Claims. (Cl. 260—78.4)

This invention relates to the preparation of aromatic polyimide articles and coatings. More particularly, it relates to the preparation of relatively stable intermediates that can be easily converted to the polyimides when desired.

The importance of relatively stable intermediates that can be easily converted to the final desired product can be appreciated by one skilled in the art. The final products, the aromatic polyimides, are known for their chemical and thermal stability. Since they do not melt easily nor dissolve easily, the difficulty of shaping this polymer into useful articles is a serious obstacle to commercial development. Recently, processes utilizing the shaping of a polyamide-acid intermediate followed by conversion to the polyimide have been proposed. However, the polyamide-acids, in many cases, tend to convert to polyimides during storage or, in some cases, are of high stability, converting only upon exposure to temperatures which are extremely high for organic materials.

It is an object of this invention to provide intermediates that are sufficiently stable to be stored for long periods, yet sufficiently "unstable" to convert relatively easily to polyimide when desired. Other objects will appear hereinafter.

The objects are accomplished by the use of an intermediate linear polymer, an aromatic poly(1,5-tetrazole-acid) having the formula:

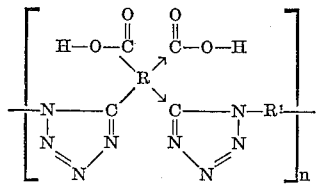

wherein the arrows denote isomerism [1];

R is an aromatic tetravalent organic radical;
$R^1$ is arylene; and
$n$ is an integer sufficiently high to provide a film-forming polymer, i.e., having an inherent viscosity at 30° C. of at least 0.1, preferably 0.3–5.0, as measured as a 0.5% solution in a suitable solvent (concentrated sulfuric acid, N,N-dimethylacetamide, etc.).

The process for producing such polytetrazole acids involves the formation of a polyisoimide or, more accurately, a polyiminolactone [2] having the following formula:

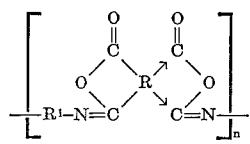

and, thereafter, reacting the polylactone with hydrazoic acid ($HN_3$) to form the polytetrazole acid. The polyiminolactone may be prepared by any of several methods.

[1] In any recurring unit the groups to which arrows point may exist as shown or in interchanged position.
[2] Anhydrides of acids in which the C=O groups are ortho give 5-imino-γ-lactones. Anhydrides of acids in which the C=O groups are peri give 6-imino-δ-lactones.

One method, as disclosed in copending U.S. application Ser. No. 325,479, filed Nov. 21, 1963, now Patent No. 3,282,898, by Rudolph J. Angelo and assigned to the assignee of the present application involves reacting an aromatic dianhydride and an aromatic diamine under conditions to form a polyamide-acid followed by treatment with N,N'-disubstituted carbodiimides of the formula $R^7-N=C=N-R^7$ wherein $R^7$ is alkyl or aryl, preferably n-butyl, phenyl, meta-tolyl, para-tolyl, meta-chlorophenyl, para-chlorophenyl, meta-nitrophenyl, cyclohexyl, para-methoxyphenyl or alpha-naphthyl.

Another method for preparing the polyiminolactones is disclosed in copending U.S. application Ser. No. 325,441, filed Nov. 21, 1963, now Patent No. 3,271,366, by John A. Kreuz and assigned to the assignee of the present application. This method involves treating a polyamide-acid with a compound from the group consisting of lower fatty acid halides, halogenated lower fatty acid halides, halogenated lower fatty acid anhydrides, aryl phosphonic dihalides and thionyl halides to form the polyiminolactone.

The first step, the preparation of the polyamide-acid composition, involves reacting at least one aromatic diamine having the structural formula $H_2N-R^1-NH_2$ with at least one tetracarboxylic acid dianhydride having the structural formula

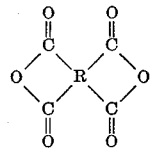

wherein R is a tetravalent aromatic radical and $R^1$ is arylene, in an organic solvent for at least one of the reactants, the solvent being inert to the reactants, preferably under anhydrous conditions, for a time and at a temperature sufficient to provide the polyamide-acid:

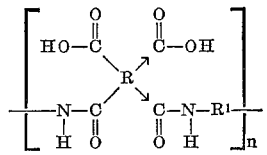

It should be understood that it is not necessary that the polymeric component of the composition be composed entirely of the polyamide-acid. This is particularly true since conversion to other intermediates and, eventually, conversion to the polyimide is contemplated subsequently. For purposes of this invention, it has been found that in most instances the polymeric component of the composition should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide acceptable compositions. The particular temperature below 175° C. that must not be exceeded for any particular combination of diamine, dianhydride, solvent and reaction time to provide a reaction product composed of the desired minimum of polyamide-acid will vary but can be determined by a simple test by any person of ordinary skill in the art. However, to obtain the maximum inherent viscosity, i.e., maximum degree of polymerization, for any particular combination of diamine, dianhydride, solvent, etc., and thus produce ultimately shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid, it is desired that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g., N,N-dimethylacetamide. To calculate inherent viscosity, the viscosity of the polymer solution is measured relative to that of the solvent alone.

$$\text{Inherent viscosity} = \frac{\text{natural logarithm} \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. It has been found that the most successful results are obtained when the solvent represents at least 60% of the final solution. That is, the solution should contain 0.05–40% of the polymeric component.

By use of the term "solution," whether it is a solution of the polyamide-acide, the polyiminolactone or the polytetrazole acid, it is meant to define a solid dissolved in a liquid and vice versa. These latter, liquids dissolved in solids, are commonly called gels. The gels may exist as homogeneous masses of liquid and solid in any form.

The starting materials for forming the polyamide-acids are aromatic diamines and aromatic tetracarboxylic acid dianhydrides. The organic diamines are charcterized by the formula:

$$H_2N—R^1—NH_2$$

wherein $R^1$ is a divalent aromatic radical (arylene), preferably selected from the following groups: phenylene, naphthylene, biphenylene, anthrylene, furylene, benzfurylene and

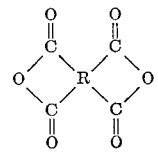

wherein $R^3$ is selected from the group consisting of an alkylene chain having 1–3 carbon atoms,

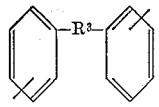

wherein $R^4$ and $R^5$ are alkyl or aryl, and substituted groups thereof. Among the diamines which are suitable for use in the present invention are: meta-phenylene diamine; para-phenylene diamine; 2,2-bis(4-amino-phenyl) propane; 4,4-diamino-diphenyl methane; 4,4'-diamino-diphenyl sulfide; 4,4' - diamino-diphenyl sulfone; 3,3'-diamino-diphenyl sulfone; 4,4'-diamino-diphenyl ether; 2,6-diamino-pyridine; bis-(4 - amino-phenyl) diethyl silane; bis-(4-amino-phenyl) diphenyl silane; benzidine; 3,3'-dichloro-benzidine; 3,3'-dimethoxy benzidine; bis-(4-aminophenyl) ethyl phosphine oxide; bis-(4 - amino-phenyl) phenyl phosphine oxide; bis-(4-amino-phenyl)-N-butylamine; bis - (4 - amino-phenyl)-N-methylamine; 1,5-diamino-naphthalene; 3,3'-dimethyl-4,4' - diaminobiphenyl; N-(3-aminophenyl)-4-aminobenzamide; 4-aminophenyl-3-aminobenzoate; and mixtures thereof.

The aromatic tetracarboxylic acid dianhydrides are characterized by the following formula:

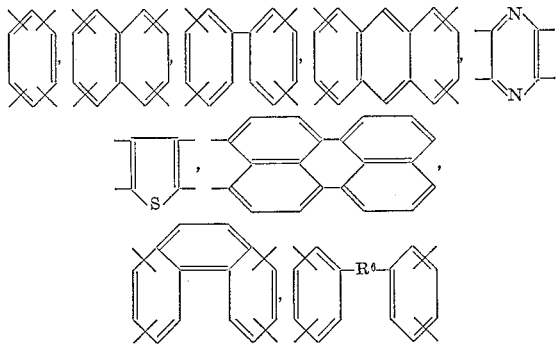

wherein R is a tetravalent aromatic radical, e.g.,

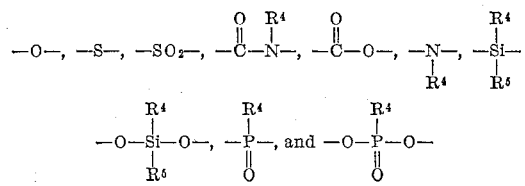

wherein $R^6$ is selected from the group consisting of $R^3$ and $$—\overset{O}{\underset{\|}{C}}—$$

In these dianhydrides every carbonyl group is attached directly to a separate carbon atom of the aromatic radical, the carbonyl groups being in pairs, the groups of each pair being adjacent to each other. Adjacent means ortho or para, so that the dicarboxylanhydro rings are 5- or 6-membered, respectively.

The preferred aromatic dianhydrides are those in which the carbon atoms of each pair of carbonyl groups are directly attached to ortho carbon atoms in the R group to provide a 5-membered ring as follows:

$$\begin{matrix} \overset{\|}{C}—O—\overset{\|}{C} \\ | \quad \quad | \\ —C———C— \\ | \quad \quad | \end{matrix} \quad \text{or} \quad \begin{matrix} \overset{\|}{C}—O—\overset{\|}{C} \\ | \quad \quad | \\ —C===C— \end{matrix}$$

Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2'3,3'-diphenyl tetracarboxylic dianhydride; 2,2-bis(3,4-dicarboxyphenyl) propane dianhydride; bis(3,4-dicarboxyphenyl) sulfone dianhydride; 3,4,9,10-perylene tetracarboxylic dianhydride; bis(3,4-dicarboxyphenyl) ether dianhydride; naphthalene-1,2,4,5-tetracarboxylic dianhydride; naphthalene-1,4,5,8-tetracarboxylic dianhydride; 2,6-dichloronaphthalene-1,4,5,8-tetracarboxylic dianhydride; 2,7 - dichloronaphthalene - 1,4,5,8-tetracarboxylic dianhydride; 2,3,6,7-tetrachloronaphthalene-1,4,5,8-tetracarboxylic dianhydride; phenanthrene-1, 8,9,10-tetracarboxylic dianhydride; 2,2-bis(2,3-dicarboxyphenyl) propane dianhydride; 1,1-bis(2,3-dicarboxyphenyl) ethane dianhydride; 1,1-bis(3,4 - dicarboxyphenyl) ethane dianhydride; bis(2,3-dicarboxyphenyl) methane dianhydride; bis(3,4 - dicarboxyphenyl) methane dianhydride; bis(3,4-dicarboxyphenyl) sulfone dianhydride; benzene-1,2,3,4-tetracarboxylic dianhydride; 3,4,3',4'-benzophenone tetracarboxylic dianhydride; 2,3,2',3'-benzophenone tetracarboxylic dianhydride; 2,3,3',4'-benzophenone tetracarboxylic dianhydride; pyrazine-2,3,5,6-tetracarboxylic dianhydride; thiophene-2,3,4,5-tetracarboxylic dianhydride; etc.

The inclusion of one or more diamines or dianhydrides other than those disclosed, e.g., aliphatic diamines or aliphatic dianhydrides, as reactants in the process may detract from one or more desirable properties of the polymeric products. However, the inclusion of such materials, to the extent that they do not detract substantially from the desirable results obtained with the aromatic reactants, is contemplated.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent should be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process. The preferred solvents are the lower molecular weight members of this class, particularly N,N-dimethylformamide and N,N-dimethylacetamide. They may easily be removed from the polyamide-acid and/or polymeric shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with poor solvents such as benzene, benzonitrile, dioxane, xylene, toluene and cyclohexane.

In the next step, the polyamide-acid is converted to a polylactone having the formula:

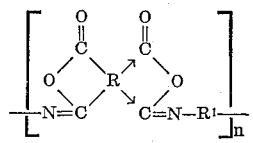

One method involves adding an N,N'-disubstituted carbodiimide in a solvent, e.g., N,N-dicyclohexyl carbodiimide in N,N-dimethylacetamide. The solvent is usually the same solvent that had been used in forming the polyamide-acid. It is necessary to add at least the stoichiometric amount of the carbodiimide (at least 1 mole per amide-acid linkage). Water is removed and adds to the carbodiimide converting the latter to a substituted urea:

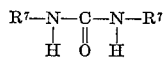

The urea usually precipitates and is removed by centrifuging or filtering, leaving a solution of the polylactone. If the urea does not precipitate, it can be removed by washing.

Another method for converting to the polylactone involves the addition of one of the following cyclizing agents to the polyamide-acid solution: lower fatty acid halide, halogenated lower fatty acid halide, halogenated lower fatty acid anhydride, aryl phosphonic dihalide and thionyl halide. Representative cyclizing agents in this group include: acetyl chloride, bromide, iodide and fluoride; propionyl chloride, bromide, iodide and fluoride; isobutyryl chloride, bromide; n-butyryl chloride, bromide; valeryl chloride; mono-, di- and tri-chloroacetyl chloride; bromoacetyl bromide; chloroacetic anhydride; trifluoroacetic anhydride; phenyl phosphonic dichloride, thionyl chloride, bromide, fluoride and chlorofluoride. Some of the cyclizing agents operate successfully alone; e.g., trifluoroacetic anhydride. The others benefit by the coaction of a tertiary amine; and the cyclizing agent is usually added at room temperature (20–30° C.) along with the tertiary amine. The tertiary amine may be selected from the following: trimethylamine, triethylamine, tri - n - butylamine, N,N-dimethylethanolamine, N,N-dimethyldodecylamine, triethylenediamine, pyridine, the picolines, 2,6-lutidine, 2,4,6-collidine, quinoline, isoquinoline, pyrazine and 2-methylpyrazine. Three particularly useful treatments for forming polylactones are: treatment of the polyamide-acid composition with chloroacetic anhydride and 2-methylpyrazine; with phenyl phosphonic dichloride and pyridine; and with trifluoroacetic anhydride alone.

In the next step of the process, the polylactone composition is treated with hydrazoic acid to form the corresponding polytetrazole acid. The hydrazoic acid generally is dissolved in an inert solvent such as benzene, heptane, carbon tetrachloride, chloroform, cyclohexane and toluene. The reaction proceeds readily at room temperature, but can be run somewhat warmer or cooler if desired. The polytetrazole acid can be used as obtained, i.e., dissolved in the solvent in which the reaction was run. The polytetrazole acid composition may be stored at this point for later use or it may be immediately used to form shaped articles.

The polytetrazole acids, when isolated, are found to be colorless or light yellow solids. They have strong infra-red bands at 3.0–3.07 microns due to carboxylic acid groups, 5.8 microns due to C=O bonds of the acid and 4.65 microns due to the tetrazole rings.

After shaping the composition composed predominantly of the polytetrazole acid, either immediately or after storage or after sale, preferably still in the solvent, into a useful article, e.g., filament, film, tube, rod, etc., and drying the article, it is preferred to convert the polytetrazole acid to another polymer to modify the properties of the shaped structures. Thus, the polytetrazole acid may be converted by heat treatment to the corresponding polyimide, specifically by heating to a temperature of at least 150° C. for 1 minute. Even at room temperature (under reduced pressure) a polytetrazole acid film changes slowly but steadily to polyimide. The polyimide has the following structural formula:

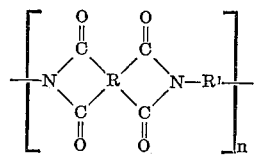

wherein R is an aromatic tetravalent radical;

$R^1$ is arylene; and $n$ is an integer sufficiently high to provide an inherent viscosity of at least 0.1, preferably 0.3–5.0, as measured as a 0.5% solution in a suitable solvent.

The final shaped article may consist of the polyimide alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer, the polytetrazole acid, can be used as a coating composition or as an adhesive layer, being converted in situ to the corresponding polyimide. The liquid composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.), polyolefins (polyethylene, polypropylene, polystyrene, etc.); polyesters (polyethylene terephthalate, etc.), polyimides, polyamides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets, etc. The polymeric substrates can be metallized before coating, or treated with a conventional adhesive or other agent to improve surface receptivity. The same substrate materials may be used as top layers over the previously-coated substrates to provide laminates wherein the polymeric composition serves as an adhesive layer. Of course, the adhesive layer can be a preformed film of the polytetrazole acid composition. Films of the final cyclized polymer can be laminated to any of the above substrates, often with the aid of a commercially available adhesive.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Special Techniques [3] known to those skilled in the art. The majority of the infrared spectra herein were taken on cast films by the use of a Perkin-Elmer Model 21 Spectrophotometer and a Perkin-Elmer Infracord Spectrophotometer.

Inherent viscosity, which is directly related to the molecular weight of the polymer, is defined by L. H. Cragg in the Journal of Colloid Science, volume I pages 261-9 (May 1946) as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer per 100 ml. of solution.

*Example 1*

A polyamide-acid of pyromellitic dianhydride and 4,4'-diaminodiphenyl ether in N,N-dimethylacetamide is cast

[3] W. M. D. Bryant and R. C. Voter, Journal of American Chemical Society, 75, 6113 (1953); and
F. W. Billmeyer, "Textbook of Polymer Chemistry," chapter 7, Interscience Publishers 1957.

onto a glass plate as a film. After being dried, the film is immersed for one hour in a 1 molar benzene solution of trifluoroacetic anhydride at room temperature to form a film of poly(5-imino-γ-lactone). This film is washed in benzene. It is then placed in a dilute solution of hydrazoic acid in benzene (0.065 g./ml.). After 4 hours the film is washed with benzene and dried overnight under nitrogen at reduced pressure (below 1 atmosphere). The pale yellow film shows infra-red absorption at 3.0 microns (carboxylic acid group), 5.8 microns (acid carbonyl) and 4.65 microns (tetrazole ring). This spectrum and elemental analyses confirm that the desired polytetrazole-acid structure has been obtained. Its inherent viscosity is greater than 0.3.

The polytetrazole-acid film is heated for 1 minute at 150° C. The infra-red absorption characteristic of tetrazole disappears before the end of this heating period. The resulting polyimide film has good film properties. This temperature and time for conversion indicates that polytetrazole acid can be converted more easily to polyimide than the corresponding polyamide-acid.

*Example 2*

A sample of polytetrazole acid having the same chemical composition as the tetrazole acid polymer of Example 1 is dissolved in N,N-dimethylacetamide. This solution is stored at room temperature until ready for shaping and conversion of the polytetrazole acid to polyimide. A film is cast from this solution and dried at 140° C. for 15 minutes. It shows essentialy no tetrazole absorption in the infra-red spectrum but instead, that the polytetrazole acid has changed to polyimide.

A second polytetrazole acid film made in the same way is dried at 200–300° C. for 1 hour. This product shows strong polyimide infra-red absorption.

*Examples 3–7*

Example 1 is repeated, using polyiminolactones in which R is a tetravalent aromatic radical corresponding to each of the following tetracarboxylic acids (i.e., derived theoretically by removal of the carboxyl groups);

3,3',4,4'-benzophenone tetracarboxylic acid
2,2-bis(3,4-dicarboxyphenyl)propane
bis(3,4-dicarboxyphenyl)sulfone
bis(3,4-dicarboxyphenyl)ether
3,3',4,4'1diphenyltetracarboxylic acid In each case, the corresponding polytetrazole acid is formed. After shaping the polytetrazole acid film, heating at 150–200° C. for 10 minutes converts the polymer to polyimide.

*Examples 8–12*

Likewise, polytetrazole-acids in which $R^1$ differs are formed by substituting in Example 1 polyiminolactones of the following diamines:

m-phenylenediamine;
4,4-diaminodiphenyl sulfone;
4,4'-diaminodiphenyl methane;
4,4'-diaminodiphenyl propane;
2,4-diamino isopropylbenzene.

Solutions of these polymers in N,N-dimethylacetamide coated onto copper wire and aluminum foil are converted readily to tough polyimide coatings by heating at 150–200° C. for several minutes.

*Examples 13–19*

The procedure of Example 1 is repeated, using instead of trifluoroacetic anhydride each of the following cyclizing agents, at 1 molar concentration in a benzene solution also containing pyridine:

Ex. 13—acetyl chloride
Ex. 14—phenyl phosphonic dichloride
Ex. 15—chloroacetic anhydride
Ex. 16—propionyl fluoride Ex. 17—valeryl chloride
Ex. 18—bromoacetyl bromide
Ex. 19—thionyl chloride.

*Example 20*

The procedure of Example 1 is repeated, using a solution of N,N-dicyclohexylcarbodiimide in N,N-dimethylacetamide instead of trifluoroacetic anhydride in benzene.

What is claimed is:

1. A shapeable composition comprising a linear film-forming polymer consisting essentially of recurring units of

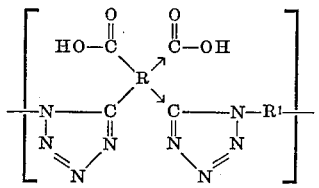

wherein the arrow denotes isomerism;

R is an aromatic tetravalent organic radical; and
$R^1$ is arylene;

in a solvent therefor.

2. The composition of claim 1 in the form of a self-supporting film.

3. The composition of claim 1 wherein R is selected from the group consisting of the aromatic radicals in pyromellitic dianhydride, 3,3',4,4'-diphenyl tetracarboxylic dianhydride, 2,2-bis(3,4-dicarboxyphenyl) propane dianhydride, bis(3,4-dicarboxyphenyl) sulfone dianhydride, bis(3,4-dicarboxyphenyl) ether dianhydride and 3,4,3',4'-benzophenone tetracarboxylic dianhydride.

4. The composition of claim 1 wherein $R^1$ is selected from the group consisting of metaphenylene, 4,4'-diphenyl propane, 4,4'-diphenyl methane, 4,4'-diphenyl ether and 4,4'-diphenyl sulfone.

5. A shaped article of a polymer consisting essentially of recurring units of

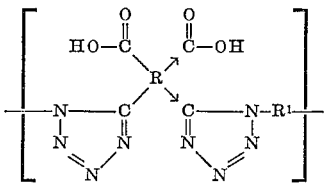

wherein the arrow denotes isomerism;

R is an aromatic tetravalent organic radical; and
$R^1$ is arylene.

6. A self-supporting film of a polymer consisting essentially of recurring units of

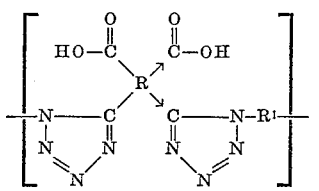

wherein the arrow denotes isomerism;

R is an aromatic tetravalent organic radical; and
$R^1$ is arylene.

7. A process for preparing shapeable polymeric compositions which comprises treating a polymeric composition containing polyiminolactone consisting essentially of recurring units of the formula:

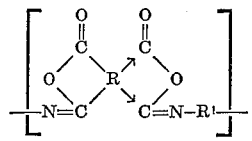

wherein the arrows denote isomerism;

R is an aromatic tetravalent organic radical; and
$R^1$ is arylene;

with hydrazoic acid to form a polymeric composition containing a polytetrazole acid having the recurring units of the formula:

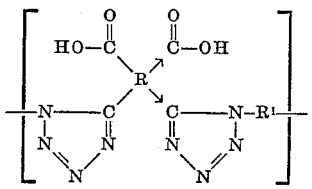

wherein the arrows denote isomerism;

R is an aromatic tetravalent organic radical; and
$R^1$ is arylene.

8. A process for preparing shaped articles which comprises treating a polymeric composition containing polyiminolactone consisting essentially of recurring units of the formula:

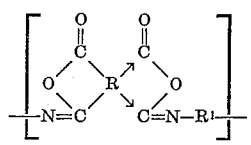

wherein the arrows denote isomerism;

R is an aromatic tetravalent organic radical; and
$R^1$ is arylene;

with hydrazoic acid to form a polymeric composition containing a polytetrazole acid of the formula

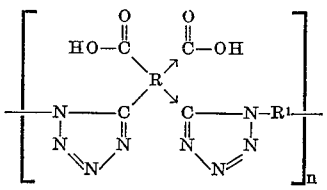

wherein the arrows denote isomerism;

R is an aromatic tetravalent organic radical;
$R^1$ is arylene; and
$n$ is an integer sufficiently high to provide a film-forming polymer;

shaping said polymeric composition containing polytetrazole acid into a shaped article; and heating said article at a temperature of at least 150° C. for a time sufficient to convert the polytetrazole acid of said article to polyimide.

9. A process as in claim 8 wherein said shaped article is a self-supporting film.

10. A process for preparing shapeable polymeric compositions which comprises reacting at least one diamine having the structural formula $$H_2N-R^1-NH_2$$

wherein $R^1$ is arylene, the two amino groups of said diamine each attached to separate carbon atoms of $R^1$; with at least one aromatic tetracarboxylic acid dianhydride,

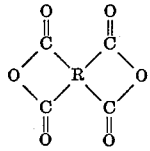

wherein the four carbonyl groups of said dianhydride are directly attached to an aromatic ring of said dianhydride in an organic solvent for at least said diamine, said solvent being inert to the system, while maintaining the temperature throughout the reaction sufficiently below 175° C. to form a polymeric composition containing a polyamide-acid consisting essentially of recurring units of the formula:

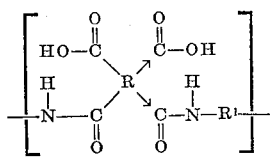

wherein the arrows denote isomerism;

R is an aromatic tetravalent organic radical; and
$R^1$ is arylene;

treating said polyamide-acid with a compound selected from the group consisting of lower fatty acid halides, halogenated lower fatty acid halides, halogenated lower fatty acid anhydrides, aryl phosphonic halides, thionyl halides, and compounds having the formula

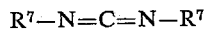

wherein $R^7$ is selected from the group consisting of alkyl and aryl to form a polymeric composition containing polyiminolactone consisting essentially of recurring units of the formula:

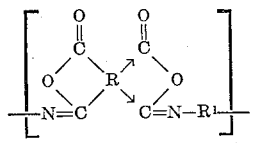

wherein the arrows denote isomerism;

R is an aromatic tetravalent organic radical; and
$R^1$ is arylene;

with hydrazoic acid to form a polymeric composition containing a polytetrazole acid having the recurring units of the formula:

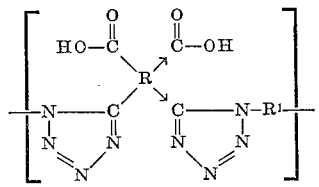

wherein the arrows denote isomerism;

R is an aromatic tetravalent organic radical; and
$R^1$ is arylene.

No references cited.

JOSEPH L. SCHOFER, *Primary Examiner.*

J. KIGHT, *Examiner.*